(12) United States Patent
Du et al.

(10) Patent No.: US 12,474,881 B1
(45) Date of Patent: Nov. 18, 2025

(54) DISPLAY ALIGNMENT ADJUSTMENT

(71) Applicant: Lenovo (United States) Inc., Morrisville, NC (US)

(72) Inventors: Wenyu Du, Beijing (CN); Rod D. Waltermann, Rougemont, NC (US); Jung Hwan Hong, Cary, NC (US); Christopher Smith, Franklinton, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/902,656

(22) Filed: Sep. 30, 2024

(51) Int. Cl.
  *G09G 5/00* (2006.01)
  *G06F 3/04812* (2022.01)
  *G06F 3/14* (2006.01)

(52) U.S. Cl.
  CPC ........ *G06F 3/1423* (2013.01); *G06F 3/04812* (2013.01)

(58) Field of Classification Search
  CPC ...... G06F 3/0481; G06F 3/04812; G06F 3/14; G06F 3/1423
  See application file for complete search history.

(56) References Cited

U.S. PATENT DOCUMENTS

| | | | |
|---|---|---|---|
| 9,569,164 B2 * | 2/2017 | Locker ................ | G06F 3/1462 |
| 9,916,119 B2 * | 3/2018 | Jeung ................. | G06F 3/1423 |
| 11,307,748 B2 * | 4/2022 | Greenebaum ....... | G06F 3/04845 |
| 11,385,781 B2 * | 7/2022 | Greenebaum ........ | G09G 5/003 |
| 11,818,184 B2 * | 11/2023 | Leppänen ............ | G06F 3/0346 |
| 2005/0168399 A1 * | 8/2005 | Palmquist ............ | G06F 1/1601 345/1.1 |
| 2011/0252317 A1 * | 10/2011 | Keranen ............... | G06F 1/1698 715/702 |
| 2012/0060109 A1 * | 3/2012 | Han ...................... | G09G 5/14 455/418 |
| 2018/0107358 A1 * | 4/2018 | Chodakowski ...... | G06F 3/0481 |
| 2022/0171530 A1 * | 6/2022 | VanBlon .............. | G06F 3/0216 |

* cited by examiner

*Primary Examiner* — Joe H Cheng (74) *Attorney, Agent, or Firm* — FERENCE & ASSOCIATES LLC (57) ABSTRACT

One embodiment provides a method, including: identifying, utilizing a display alignment system, an initial orientation of an information handling device and at least one secondary device paired with the information handling device, wherein a display of the information handling device and a display of the at least one secondary device having an initial alignment based upon the initial orientation; identifying, using the display alignment system, a change in the initial orientation to a second orientation; and adjusting, utilizing the display alignment system, an alignment position between the information handling device and the at least one secondary device, wherein the adjusting includes modifying cursor movement between the display of the information handling device and the display of the at least one secondary device. Other aspects are claimed and described.

20 Claims, 4 Drawing Sheets

DISPLAY ALIGNMENT ADJUSTMENT

BACKGROUND

An information handling device that utilizes multiple displays provides a user with an ability to simultaneously view more information at a single time than using a single display. Most devices include a single display. Therefore, when a user is utilizing multiple displays in connection to an information handling device, it is commonplace for a display to be, for example, made by a different company, comprise different design features, be a different size, and/or the like. However, there are also situations where a user setup may include devices that are all from the same company, are consistent in their design features, and/or the like. No matter the product-type and/or features, a device may still work in combination with the additional devices and/or displays connected to produce a multiple display system for an information handling device in use.

BRIEF SUMMARY

In summary, one aspect provides a method, the method including: identifying, utilizing a display alignment system, an initial orientation of an information handling device and at least one secondary device paired with the information handling device, wherein a display of the information handling device and a display of the at least one secondary device having an initial alignment based upon the initial orientation; identifying, using the display alignment system, a change in the initial orientation to a second orientation; and adjusting, utilizing the display alignment system, an alignment position between the information handling device and the at least one secondary device, wherein the adjusting includes modifying cursor movement between the display of the information handling device and the display of the at least one secondary device.

Another aspect provides a system, the system including: a processor; a memory device that stores instructions that, when executed by the processor, causes the system to: identify, utilizing a display alignment system, an initial orientation of an information handling device and at least one secondary device paired with the information handling device, wherein a display of the information handling device and a display of the at least one secondary have an initial alignment based upon the initial orientation; identify, using the display alignment system, a change in the initial orientation to a second orientation; and adjust, utilizing the display alignment system, an alignment position between the information handling device and the at least one secondary device, wherein the adjusting includes modifying cursor movement between the display of the information handling device and the display of the at least one secondary device.

A further aspect provides a product, the product including: a computer-readable storage device that stores executable code that, when executed by a processor, causes the product to: identify, utilizing a display alignment system, an initial orientation of an information handling device and at least one secondary device paired with the information handling device, wherein a display of the information handling device and a display of the at least one secondary have an initial alignment based upon the initial orientation; identify, using the display alignment system, a change in the initial orientation to a second orientation; and adjust, utilizing the display alignment system, an alignment position between the information handling device and the at least one secondary device, wherein the adjusting includes modifying cursor movement between the display of the information handling device and the display of the at least one secondary device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Connection of devices and/or displays to an information handling device permits a user to display more information at a time. Presenting more information at an instance will allow a user to reference, view, and/or alter information without the need to minimize and/or close information on a display that is deemed unnecessary. Rather, a user will just transition focus. Since an information handling device is traditionally provided with a single display, to get a multi-monitor setup, a user is required to connect additional devices or displays. In connecting an additional device, a user will conventionally utilize a wired connection between an information handling device and/or display. A wired connection may allow for transferring of display data between the devices, which commonly results in inconsistencies across the displays. For example, when moving a cursor from one display to another, there may be a jump and/or misalignment of display positions between the displays, particularly if the displays have disparate characteristics (e.g., size, resolution, etc.). Conventionally, a user will have to manually adjust display preferences within a system to correct these inconsistencies.

As technology has advanced and wireless connections between devices has become more prevalent, the inconsistencies between a connection of devices and/or displays remains. A wireless connection between devices that are expanding a display of an information handling device will still face alignment issues, lagging, resolution issues, and/or the like. These inconsistencies are addressed in the same way as the wired connection, requiring a user to enter a settings menu of an information handling device and attempting to manually adjust display characteristics in an attempt to achieve a smooth transition between displays. Unfortunately, a common response to the presence of such inconsistencies results in a user simply dealing with the inconsistencies, which can grow frustrating with continued use. Therefore, what is needed is a system and method that may automatically ensure consistency across multiple devices as they are connected, and further account for orientation changes of the devices while maintaining an aligned, multi-device system.

Accordingly, the described system provides a method for adjusting an alignment position between an information handling device and at least one secondary device by user of a display alignment system, particularly when there is a change in orientation of the one of the devices. A display alignment system may identify an initial orientation of an information handling device and at least one secondary device paired with the information handling device. A secondary device may be any device that contains a display, for example, a standalone monitor, a television, a tablet, and/or the like. Additionally, the secondary device and the information handling device may be paired while the system identifies the initial orientation of the devices. An initial orientation of the paired devices may identify a relationship between an information handling device and at least one secondary device, for example, an initial orientation may determine that a display of an information handling device is operating in a landscape orientation and a secondary device is also operating in a landscape orientation. As will be described further herein, an initial orientation of a device is not limited to a presentation-type of a device. An initial orientation may be utilized to establish an initial alignment between an information handling device and at least one secondary device.

A display alignment system may identify a change in the initial orientation to a second orientation. For example, a user may elect to adjust an orientation of at least one of the devices that are paired together. Upon this identification of transitioning from an initial orientation to a second orientation, a device alignment system may monitor characteristics of a device to determine a second orientation. Then, when it is determined that a change in orientation of at least one device is identified, a display alignment system may adjust an alignment position between the information handling device and a secondary device. Adjusting an alignment between the devices may include modifying cursor movement between a display of the information handling device and a display of the at least one secondary device. Such a system and method provides an improvement over traditional multiple display system alignment methods by use of a display alignment system. The display alignment system may utilize one or more characteristics associated with a display of a device to determine an accurate alignment of displays subsequent to a change in orientation of at least one of an information handling device and at least one secondary device.

The illustrated example embodiments will be best understood by reference to the figures. The following description is intended only by way of example, and simply illustrates certain example embodiments.

Figure 1:
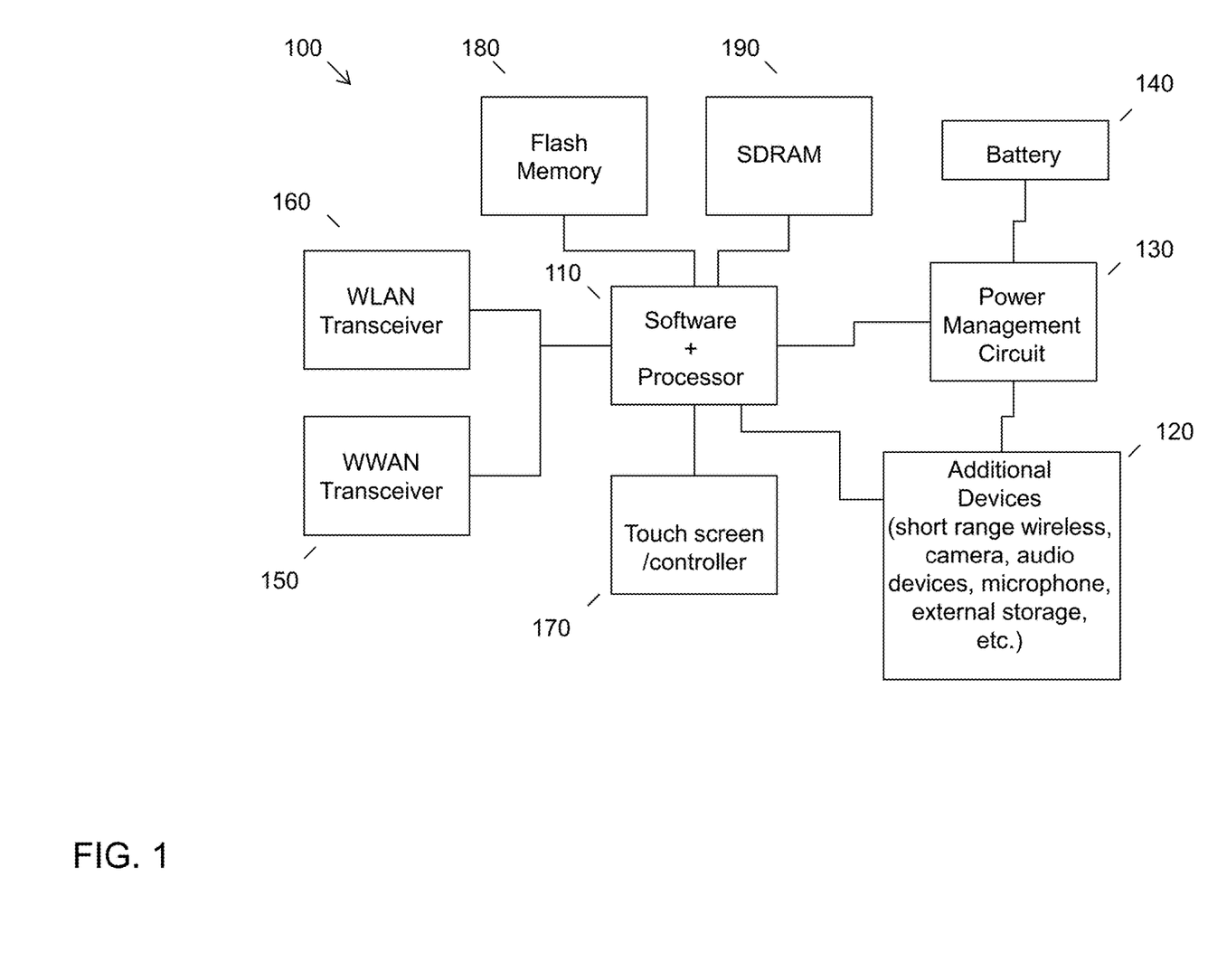
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
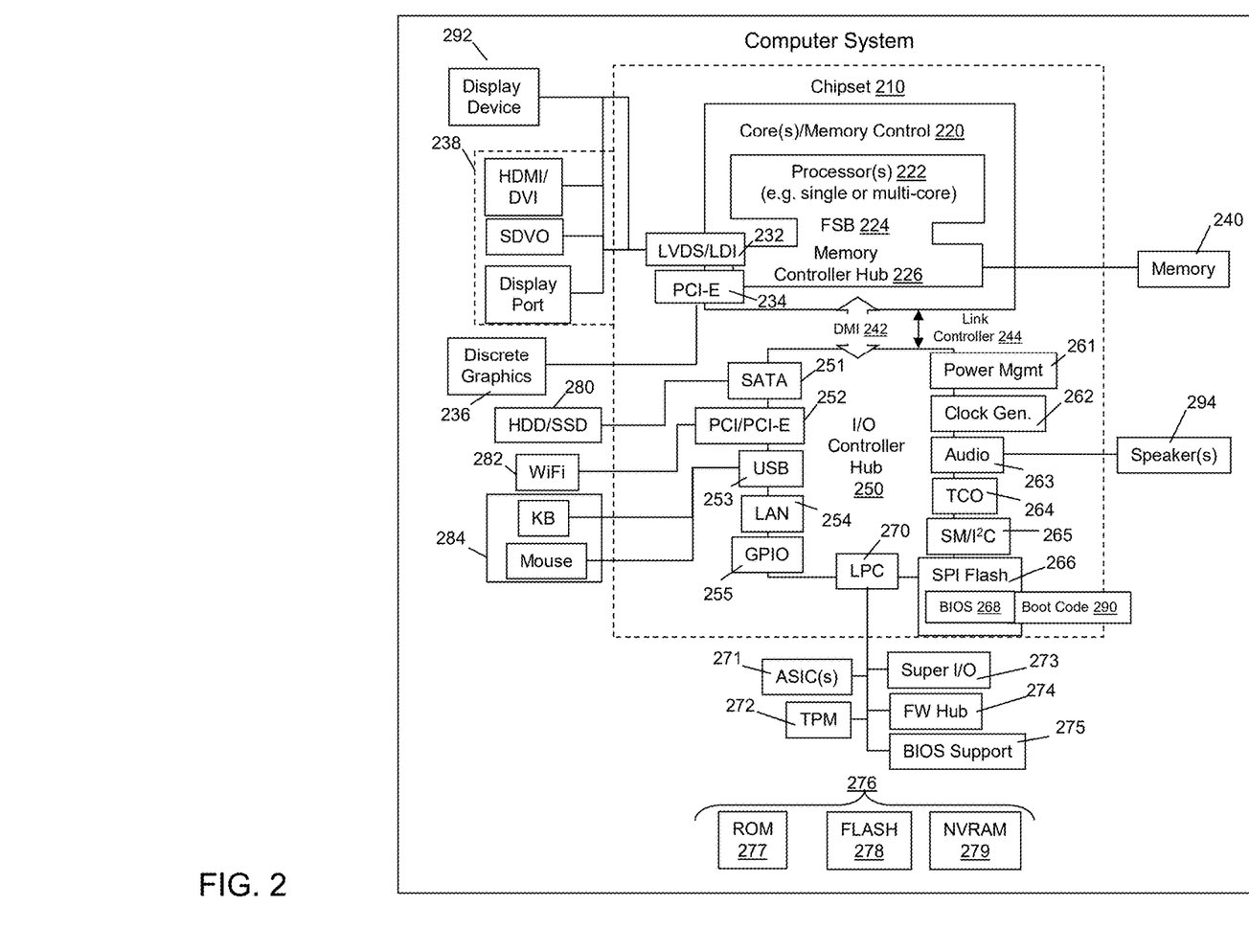
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may include devices that may be paired with each other. For example, the circuitry outlined in FIG. 1 may be implemented in a tablet or smart phone embodiment, whereas the circuitry outlined in FIG. 2 may be implemented in a personal computer embodiment.

Figure 3:
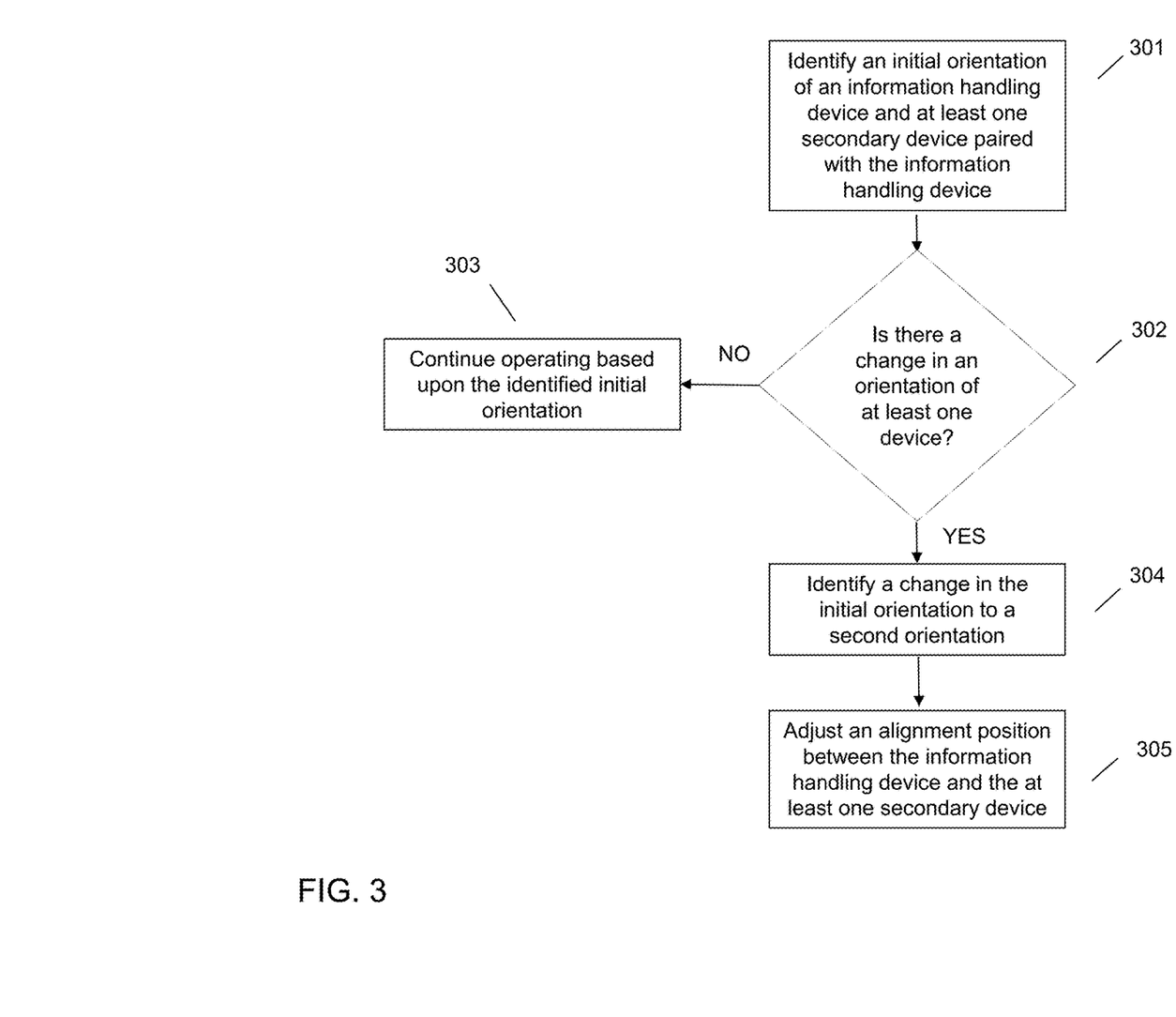
FIG. 3 illustrates an example method for adjusting an alignment position between the information handling device and at least one secondary device by use of a display alignment system.

FIG. 3 illustrates an example method for pairing an information handling device and at least one additional device by use of a display alignment system. The method may be implemented on a system which includes a processor, memory device, output devices (e.g., display device, etc.), input devices (e.g., keyboard, touch screen, mouse, microphones, sensors, etc.), and/or other components, for example, those discussed in connection with FIG. 1 and/or FIG. 2. While the system may include known hardware and software components and/or hardware and software components developed in the future, the system itself is specifically programmed to perform the functions as described herein to adjust an alignment position between an information handling device and at least one secondary device by user of a display alignment system that identifies a change in orientation of at least one device to a second orientation. Additionally, the display alignment system includes modules and features that are unique to the described system.

The display alignment system may be activated when the device is activated. Additionally, or alternatively, the system may be activated when a display alignment application, a display settings application, and/or the like, is activated, detected, or otherwise opened. The system may also be activated upon detecting that an additional display is detected. For example, the display alignment system may be activated in order to train one or more artificial intelligence models corresponding to the display alignment system, identifying an initial orientation of an information handling device and/or at least one secondary device, identifying a change in a device orientation, and/or the like. Thus, the display alignment system may be activated either manually or automatically when the display alignment system is needed.

The display alignment system may be a standalone system, may be accessible through other computing devices, and/or a combination thereof. For example, the display alignment system may be a standalone system accessed by a user and/or may be provided as an application that is accessible by a user on a computing device. The display alignment system may be accessible using any type of computing device, for example, a personal computer, laptop computer, smartphone, tablet, smartwatch, smart television, smart appliance, augmented reality device, virtual reality device, display, and/or the like. The display alignment system may be accessible locally using a computing device where the display alignment system is installed and/or may be accessible remotely through another computing device. However, the display alignment system may be located and operated on an information handling device to perform the described steps.

The display alignment system may utilize one or more artificial intelligence models in identifying an initial orientation of an information handling device and at least one secondary device paired with the information handling device, identifying a change in the initial orientation to a second orientation, adjusting an alignment between the information handling device and the at least one secondary device by use of a display alignment system, and/or the like. Artificial intelligence models may also be used for steps within a step. For example, a model could be utilized to capture and analyze sensors information to identify an initial orientation of a paired device and identify a change in the initial orientation to a second orientation. As another example, a model could be utilized to identify an alignment position calculation and adjust an alignment position between the information handling device and the at least one secondary device by use of the display alignment system.

For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the display alignment system or may be a model that is created from scratch. Since the display alignment system is used in conjunction with adjusting an alignment between displays some models that may be utilized by the system are image analysis models, audio analysis models, other analysis models, entity identification models, similarity identification models, language models, large language models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the model ingests this feedback to refine the model.

On the other hand, as the model makes predictions in connection with performing the described steps, and no changes are made to the resulting prediction, the model may utilize this as feedback to further refine the model. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural networks, convolutional neural networks, deep neural networks, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The display alignment system may include different components for carrying out different functions of the system, including different steps to be performed. These components may be hardware components or software components. Some hardware components may include sensors (e.g., image capture devices, proximity sensors, microphones, accelerometers, orientation sensors, etc.) that can be used to identify an initial orientation of an information handling device and at least one secondary device paired with the information handling device, identify a change in the initial orientation to a second orientation, adjust an alignment position between the information handling device and the at least one secondary device, and/or the like. Other input devices may be utilized to assist with identifying an initial orientation of an information handling device and at least one secondary device paired with the information handling device, identifying a change in the initial orientation to a second orientation, adjusting an alignment position between the information handling device and the at least one secondary device and/or the like, for example, mechanical input modalities (e.g., keyboard, mouse, etc.), touch input devices, gesture input devices, electromyography input devices, audio input devices, and/or the like. Other hardware components may be utilized to provide output from the display alignment system.

One software component may include a user profile which may be unique to a user and may assist in determining how to align the devices. For example, the user profile may identify user preferences regarding pairing of devices, how alignment positions should be adjusted, and/or the like. The user may manually input this data into the profile or the information may be populated by the system as the system learns about the user over time. For example, the system may utilize an artificial intelligence model to learn about the user, make correlations between information received from sensors and other inputs and alignment adjustments of the device, and/or the like. This information can be populated within the user profile for use by the system during subsequent alignment position adjustments. The user profile may also include other information about the user that seems to influence how alignment positions are adjusted, how devices are paired, how much movement triggers an adjustment in alignment, and/or the like.

At 301, a system may identify an initial orientation of an information handling device and at least one secondary device paired with the information handling device. A display alignment system may first identify when an information handling device and at least one secondary device are paired together. Pairing at least two devices togethers indicates that the system is utilizing the at least two devices in combination. For example, pairing an information handling device including a display with a secondary device including a display may permit a user to expand information originally present on a single display across the now paired displays. Pairing systems to operate in combination with one another is not limited to display preferences. However, as will be discussed herein, the pairing of an information handling device to at least one secondary device will concentrate on display preferences.

After identifying that an information handling device and at least one secondary deice are paired, a display alignment system associated with the information handling device may identify an initial orientation of the information handling device and identify an initial orientation of a secondary device. For ease of readability, the information handling device will refer to the device that is being utilized as the base device. Thus, the information handling device can vary among pairings, vary based upon an environment, and/or the like.

An initial orientation of a device may identify how a device is originally physically configured. The display alignment system may identify one or more orientation characteristics associated with an information handling device and at least one secondary device. Orientation characteristics include, but are not limited to, a presentation-type of a device, display resolution characteristics of a device, a size of a display of a device, and/or the like. For example, an initial orientation of a display of an information handling device may include a landscape orientation, a 1080 p video resolution, and 12"×22" display size. The display alignment system may collect such characteristics, and potentially more, in determining an initial orientation of a device that is paired to at least one additional device. The system can identify the orientation of the devices using one or more sensors on the devices, using one or more sensors or devices within an environment, using an analysis of input received from a user, and/or the like.

As the display alignment system determines an initial orientation for an information handling device and at least one secondary device that are paired together, the system may also identify an initial alignment of the displays of each the information handling device and the at least one secondary device. An initial alignment between the display of the information handling device and the at least one secondary device identifies how the devices interact with each other, for example, how the displays are configured with respect to each other. For example, an initial alignment of an information handling device in a landscape orientation and a secondary device in a portrait orientation may differ in size parameters, thereby, influencing how a cursor may move between the displays of each device.

When a difference in device orientation, device size, device resolution, and/or the like, is present between paired devices, a display alignment system may work to minimize movement issues between the display. In other words, the display alignment system may utilize display characteristics, including a center-point of each display, to calculate and thereafter determine the smoothest transition between device displays. Minimizing movement issues between displays may promote easy use and transitions between displays present in a system. Thus, the initial alignment identifies offsets and other characteristic related to how information is displayed across the displays, including cursor movement, images across the devices, and/or the like.

When identifying an initial orientation and performing an initial alignment of the display of the information handling device and the display of the at least one secondary device, a device alignment system may utilize a graphical user interface to identify a pairing between the devices and the initial alignment of the devices. The graphical user interface may include providing a visual indicator along an edge of a device indicating how the devices are paired and aligned. The secondary device may also display the graphical user interface, and may also include a visual indicator present at an edge of a display of the secondary device indicating a pairing and alignment relationship with the information handling device.

For example, upon activation of a graphical user interface at an information handling device, a visual indicator located along the right edge of the display of the information handling device may be provided, and visual indicator located along the left edge of the display of a secondary device may also be provided. The visual indicators may be offset with respect to each other to identify the alignment. The offset may be none and the visual indicators of the information handling device and the other device may be aligned across the displays. Therefore, the graphical user interface may indicate a relationship and alignment between the devices through the edges of the displays containing the visual indicator, for example, identifying how a cursor will move from the display of the information handling device through a right edge of the display through the left edge of the display of the secondary device. A graphical user interface associated with a display alignment system may permit the adjusting of a location of a visual indicator along an edge of a display of an information handling device and an edge of a secondary device to align the displays of the devices.

Additionally, a graphical user interface associated with display alignment system may identify a center point of an edge of a display to further assist with aligning information between a display of an information handling device and a display of a secondary device. Since a display alignment system may recognize a size characteristic of both a display of the information handling device and a secondary device, a visual indicator may identify a center of an edge comprising the visual indicator to determine where the smoothest movement across a display is present. For example, if a display of an information handling device has an alignment point, or a center point along an edge, that is 6" from the top of the display and a display of a secondary device has an alignment portion that is 2.5" from the top of the display, the device alignment system may establish an offset so that when a cursor is moving across a display to the other display that a location of receipt of the cursor on the other display may be consistent with the movement of the cursor. In other words, rather than a cursor jumping, and/or being inconsistent, with the movement between devices, as is traditionally found display pairing methods, the display alignment system, based upon the presence of the visual indicator and an alignment point, may permit a smooth transition between displays regardless of the size of the displays that are paired together.

An initial orientation, and therefore, an initial alignment of the display of the information handling device and the display of the at least one secondary device may utilize characteristics of each display to determine an alignment or center point between the displays. Then, a device alignment system may determine, at 302, if there is a change in an orientation of at least one of the devices that is paired together. As mentioned previously, a change in orientation is not limited to a display presentation-type, i.e., portrait orientation and landscape orientation. When it is determined that there is no change in orientation of the at least one of the information handling device and the at least one secondary device, the device alignment system may continue operating based upon the identified initial orientation at 303. However, when it is determined that at least one of the devices has experienced a change in orientation at 302, a device alignment system may identify the change in the initial orientation to a second orientation 304.

Using the display alignment system to identify a change in the initial orientation to a second orientation, the system may first identify which device, and/or all devices, has changed to a second orientation. Identifying a change may include identifying an orientation of the at least one secondary device has changed. Additionally, and/or alternatively, identifying a change may include identifying an orientation of the information handling device has changed. Based upon at least one display characteristic of a device orientation that has changed, the display alignment system may utilize the identified characteristic change to thereafter adjust an alignment position between the information handling device and the at least one secondary device at 305.

Identifying a change may include identifying a change in a size characteristic of one of the display of the information handling device and the display of the at least one secondary device. A change in a size characteristic may include identifying a change in resolution of the of the display has transitioned from an initial orientation to a second orientation. In other words, orientation does not just refer to a physical orientation of the device(s), but also refers to characteristics of the display(s) that can change how the displays interact with each other. Resolution of a display may be dependent on parameters of a display, therefore, when a change in the parameters is identified, a change in resolution may be identified. For example, a secondary device that has size parameters of 5"×9" initially may then be rotated about a center-point to then have the size parameters of 9"×5". In other words, the previous height size is now the width size and the previous width size is now the height size.

The resolution, and/or the amount of pixels-per-inch, of a display may also change with the parameter sizes. Alternatively, the resolution may be changed without changing the orientation of the device. Therefore, the alignment point present along a perimeter may need adjusting. Additionally, and/or alternatively, when identifying a change in the initial orientation to a second orientation, the display alignment system may identify a change in presentation-style from a portrait orientation to a landscape orientation and/or a landscape orientation to a portrait orientation. A transition between orientation styles may be modified about a centerpoint of the display.

After identifying a change in the initial orientation to a second orientation for at least one of an information handling device and/or at least one of a secondary device, the device alignment system may adjust an alignment position between the information handing device and the at least one secondary device at 305. Adjusting an alignment position between paired devices may result in a modification of cursor movement between the display of the information handling device and the display of the at least one secondary device. In other words, based upon the identified second orientation of the at least one of the information handling device and the at least one of the secondary device, an alignment adjustment may be performed to ensure that cursor movement, or other data that spans the two or more devices, between displays remains smooth and/or does not include movement inconsistencies, for example, jumping, lagging, glitching, and/or the like. Rather, the adjusting the alignment position may further promote continuous cursor movement between paired devices and their displays.

An identified size of the display of an information handling device and an identified size of the display of the at least one secondary device may influence the adjustment of an alignment position because an alignment position between the identified size of each display of each device that has undergone a change to a second orientation may include altered display characteristics in comparison to the characteristics of each display in the initial orientation. In other words, an alignment position between paired devices changes in response to identifying a change in orientation, thereby, requiring an adjustment of alignment position between the displays of the devices.

Adjusting the alignment position may include calculating a pixel offset for the cursor movement based upon the second orientation of a device. A pixel offset may be calculated from the size, resolution, and/or other size characteristics of a display of the information handling device and the display of the at least one secondary device. As mentioned previously, a change in orientation of a device may influence a change in characteristics of a display of device, and a calculation of pixel offset may account for the characteristic change of the display to ensure smooth cursor movement between displays of each device.

Figure 4:
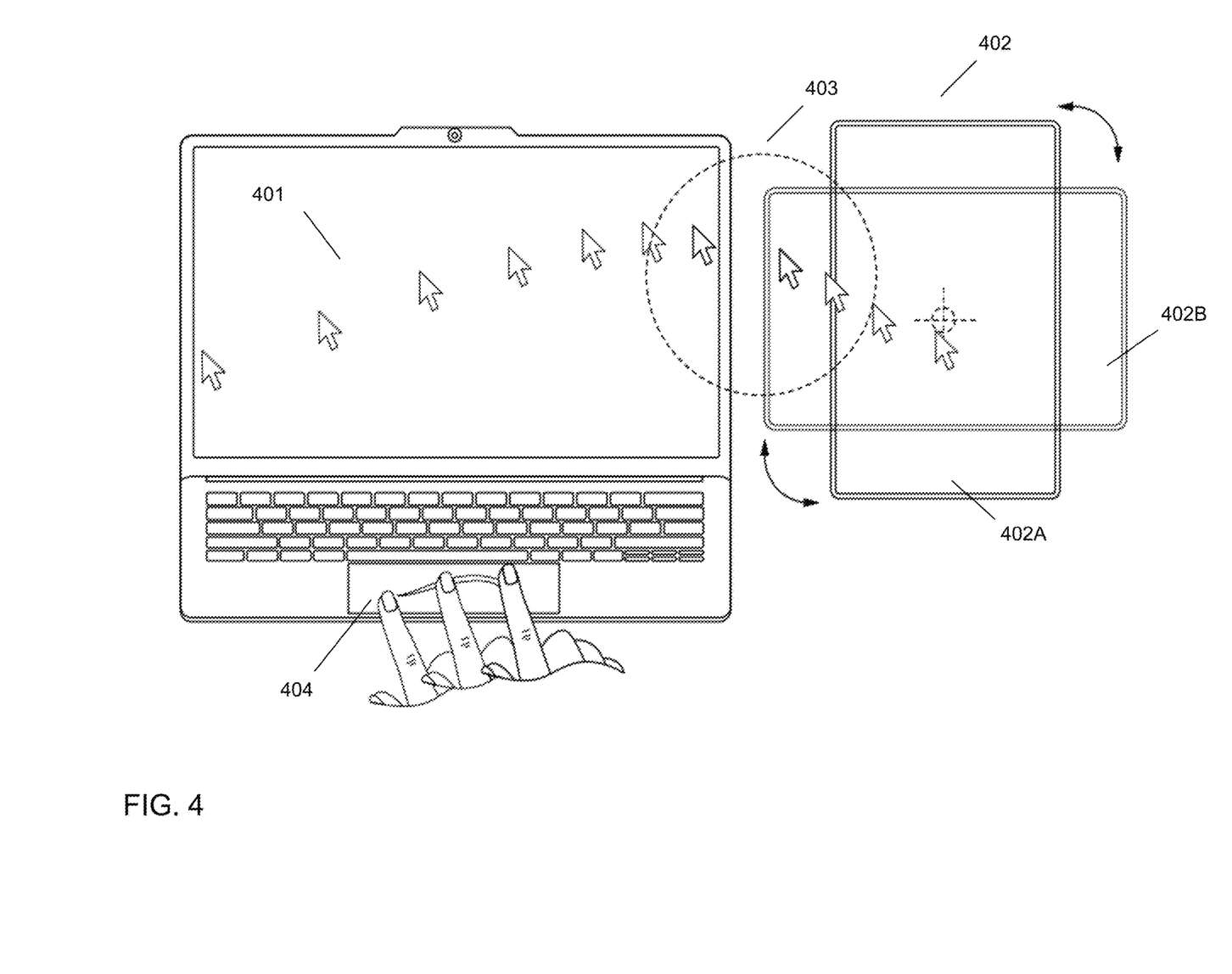
FIG. 4. illustrates an example illustration of moving a cursor between a display of an information handling device at an initial orientation and a display of a secondary device at an initial orientation and a secondary orientation.

Additionally, and/or alternatively, adjusting an alignment position may be based upon a relative position between the display of the information handling device and the display of the at least one secondary device. A relative position or distance between displays may identify a location and/or a distance between the display of the information handling device and the display of the at least one secondary device. Based upon a determined distance between the displays, a relative position may account for this distance and further support smooth movement between each display. For example, a relative distance between displays that are touching edges may be very small, therefore, when transferring a cursor across displays, the movement may be viewed as continuous. However, when a relative distance between displays is greater, for example, a distance between a display of an information handling device and television mounted on a wall 5 feet away, using the described system, transferring a cursor between displays may account for the distance present and therefore, the movement of the cursor in a diagonal motion may move past the edge of the display of an information handling device at one location and arrive at a location on the display of a television higher or lower than the point of intersection with the display of the information handling device. Such a situation is illustrated in FIG. 4.

A device alignment system may perform an adjustment of an alignment position automatically upon identifying a change in an initial orientation to a second orientation. Additionally, and/or alternatively, a device alignment position may provide a notification to a user at a display of an information handling device requesting a change in the alignment position upon recognition of the change from an initial orientation to a second orientation. The device alignment system may also present, on a display of the information handling device and the display of the at least one secondary device responsive to the adjusting, an indicator indicating the alignment position as been adjusted. An indicator indicating the adjusted alignment position may be a notification identifying the adjustment and/or may be the positioning of a visual indicator at an alignment point provided via the graphical user interface.

An example calculation of alignment position based on display size and resolution of a display of an information handling device and a display of at least one secondary device is described below. This is intended as being a non-limiting example and is used for illustrative purposes.

Subsequent to identifying a display of an information handling device and a display of secondary device are paired, and identifying their associated display characteristics, a device alignment system determines that a rotation of a secondary device has occurred. An initial orientation of the display of the information handling device is 12"×22". An initial orientation of the display of the secondary device is 5"×9", which has since been rotated to a second orientation which now is 9"×5". The device alignment system may calculate an alignment point for the display of the information handling device to be 6" from the top of the display. The device alignment system may also calculate the initial orientation alignment point for the display of the secondary device as 2.5" from the top of the display.

Thereafter, the system calculates the alignment point for the display of the secondary device at the second orientation as 4.5". As can be seen, a change in alignment point for the secondary device has transitioned from 2.5" at the initial orientation to 4.5" at the second orientation. The display alignment system may now conclude that alignment point present on the display of the information handling device and the alignment point of the display of the secondary device at the second orientation differ by 1.5". Then, with this determined difference between alignment points of the displays, the device alignment system may calculate a pixel offset between the displays from a determined dots-per-inch, and/or pixels-per-inch, ratio present between the displays. The determined difference of 1.5" between the alignment point of the display of the information handling device and the alignment point of the secondary device at a second orientation is smaller than the difference between the alignment point of the display of the information handling device and the alignment point of the secondary device at an initial orientation (3.5"), and therefore, ensures an even smoother transitions between the paired displays.

Referring now to FIG. 4, an example illustration of moving a cursor between a display of an information handling device at an initial orientation and a display of a secondary device at an initial orientation and a secondary orientation is provided. The figure provides an example view of how an adjustment of a secondary device's orientation may influence a smooth transition between displays. A display of the information handling device 401 is provided at an initial orientation. In this example, the information handling device in use is a traditional laptop present in a landscape orientation. As a user interacts with the information handling device 404 and attempts to move a cursor across a display of the information handling device to a display of the secondary device 402 having an initial orientation 402A, it can be observed that in the alignment point 403, a cursor may intersect an edge of the display of the information handling device 401 at a position higher than the position of receipt of the cursor at the edge of the secondary device 402 having the initial orientation 402A. As can be seen the alignment point 403, a relative distance between the display of the information handling device 401 and the display of the secondary device 402 having an initial orientation 402A causes the change in position intersection of a cursor with an edge of the device as the cursor moves across the displays.

Then, when an orientation of a display of the secondary device 402 transitions from an initial orientation 402A to a second orientation 402B, the alignment point 403 and the edges of each display change a relative position and distance between the displays. The second orientation 402B for secondary device 402 is a landscape orientation. As can be seen in the alignment point 403, the edge of the secondary device 402 having the second orientation 402B has an edge closer to the edge of the display of the information handling device 401. As the user interacts with the system and attempts to move the cursor 404 across display 401 to the display of the secondary device 402 having the second orientation 402B, a distance based on the relative position is still present; however, the distance has decreased. This decreased relative position between the displays 401 and 402 accounts for a receipt of a cursor through alignment point 403 at location on 402 closer to the point of intersection with the edge of the display 401.

In other words, in this example, a cursor being transferred to secondary display 402 having a second orientation 402B will show a cursor at a higher position on the display 402B and more closely related to the edge intersecting position 401 than the initial orientation 402A of the secondary device 402. However, regardless of an orientation of secondary display 402, the device alignment system will calculate an associated pixel offset to ascertain a smooth movement of a cursor between display 401 and secondary display 402.

The various embodiments present herein provide an improvement over traditional methods for adjusting an alignment position between an information handling device and at least one secondary device. Rather than requiring a user to access system settings and/or make manual changes utilizing traditional methods, the described system and method provides device alignment system that may permit easy alignment adjustment based upon an identified change in device orientation. A user may change an orientation of at least one device paired to at least one secondary device and a device alignment system, in combination with a graphical user interface, may ensure that cursor movement between displays remain smooth and consistent. This is an improvement over traditional alignment techniques that conventionally result in inconsistencies across displays or require the users to perform many manual steps to align the displays.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
    identifying, utilizing a display alignment system, an initial orientation of an information handling device and at least one secondary device paired with the information handling device, wherein a display of the information handling device and a display of the at least one secondary device having an initial alignment based upon the initial orientation;
    identifying, using the display alignment system, a change in the initial orientation to a second orientation; and
    adjusting, utilizing the display alignment system, an alignment position between the information handling device and the at least one secondary device, wherein the adjusting comprises modifying cursor movement between the display of the information handling device and the display of the at least one secondary device.

2. The method of claim 1, wherein the identifying a change comprises identifying an orientation of the at least one secondary device is changed.

3. The method of claim 1, wherein the identifying a change comprises identifying an orientation of the information handling device is changed.

4. The method of claim 1, comprising presenting, on the display of the information handling device and the display of the at least one secondary device and responsive to the adjusting, an indicator indicating the alignment position has been adjusted.

5. The method of claim 1, wherein the identifying an initial orientation comprises performing the initial alignment of the display of the information handling device and the display of the at least one secondary device based upon the initial orientation and an identified size of the display of the information handling device and an identified size of the display of the at least one secondary device.

6. The method of claim 5, wherein the adjusting comprises utilizing the identified size of the display of the information handling device and the identified size of the display of the at least one secondary device to identify the alignment position.

7. The method of claim 1, wherein the adjusting the alignment position comprises calculating a pixel offset for the cursor movement based upon the second orientation.

8. The method of claim 1, wherein the adjusting is based upon a relative position between the display of the information handling device and the display of the at least one secondary device.

9. The method of claim 1, wherein the identifying a change comprises identifying a change in a size characteristic of one of the display of the information handling device and the display of the at least one secondary device.

10. The method of claim 1, wherein the identifying a change comprises identifying a change of an orientation change selected from the group consisting of: portrait orientation to landscape orientation and landscape orientation to portrait orientation.

11. A system, the system comprising:
    a processor;
    a memory device that stores instructions that, when executed by the processor, causes the system to:
    identify, utilizing a display alignment system, an initial orientation of an information handling device and at least one secondary device paired with the information handling device, wherein a display of the information handling device and a display of the at least one secondary have an initial alignment based upon the initial orientation;
    identify, using the display alignment system, a change in the initial orientation to a second orientation; and
    adjust, utilizing the display alignment system, an alignment position between the information handling device and the at least one secondary device, wherein the adjusting comprises modifying cursor movement between the display of the information handling device and the display of the at least one secondary device.

12. The system of claim 11, wherein the identifying a change comprises identifying an orientation of the at least one secondary device is changed.

13. The system of claim 11, wherein the identifying a change comprises identifying an orientation of the information handling device is changed.

14. The system of claim 11, comprising presenting, on the display of the information handling device and the display of the at least one secondary device and responsive to the adjusting, an indicator indicating the alignment position has been adjusted.

15. The system of claim 11, wherein the identifying an initial orientation comprises performing the initial alignment of the display of the information handling device and the display of the at least one secondary device based upon the initial orientation and an identified size of the display of the information handling device and an identified size of the display of the at least one secondary device.

16. The system of claim 15, wherein the adjusting comprises utilizing the identified size of the display of the information handling device and the identified size of the display of the at least one secondary device to identify the alignment position.

17. The system of claim 11, wherein the adjusting the alignment position comprises calculating a pixel offset for the cursor movement based upon the second orientation.

18. The system of claim 11, wherein the adjusting is based upon a relative position between the display of the information handling device and the display of the at least one secondary device.

19. The system of claim 11, wherein the identifying a change comprises identifying a change in a size characteristic of one of the display of the information handling device and the display of the at least one secondary device.

20. A product, the product comprising:
- a computer-readable storage device that stores executable code that, when executed by a processor, causes the product to:
- identify, utilizing a display alignment system, an initial orientation of an information handling device and at least one secondary device paired with the information handling device, wherein a display of the information handling device and a display of the at least one secondary have an initial alignment based upon the initial orientation;
- identify, using the display alignment system, a change in the initial orientation to a second orientation; and
- adjust, utilizing the display alignment system, an alignment position between the information handling device and the at least one secondary device, wherein the adjusting comprises modifying cursor movement between the display of the information handling device and the display of the at least one secondary device.

* * * * *